United States Patent [19]

Cruise

[11] 4,280,609
[45] Jul. 28, 1981

[54] WET DISC BRAKE OR CLUTCH WITH CURVED STATOR DISC TABS

[75] Inventor: Phillip D. Cruise, Granger, Ind.

[73] Assignee: Clark Equipment Company, Buchanan, Mich.

[21] Appl. No.: 73,338

[22] Filed: Sep. 7, 1979

[51] Int. Cl.³ .............................................. F16D 13/74
[52] U.S. Cl. ............................. 192/113 B; 192/70.12; 188/218 XL
[58] Field of Search ............... 192/113 B, 114 T, 115, 192/70.11, 70.16, 70.19, 70.2, 70.12, 71; 188/218 XL

[56] References Cited

U.S. PATENT DOCUMENTS

| 1,164,531 | 12/1915 | Kwis ..................................... 192/70.2 |
| 1,702,116 | 2/1929 | Hoffman ........................ 192/70.12 X |
| 2,519,965 | 5/1973 | Wellman .............................. 188/71.6 |
| 3,081,842 | 3/1963 | Zindler et al. ............. 188/218 XL X |
| 3,301,359 | 1/1967 | Cole et al. ..................... 192/113 B X |
| 3,505,982 | 4/1970 | Walter et al. ...................... 192/113 B |
| 3,621,945 | 11/1971 | Spry ................................. 192/70.2 X |
| 3,730,301 | 8/1950 | Heck et al. ............................ 192/107 |
| 3,915,269 | 10/1975 | Houser .......................... 192/113 B X |
| 4,173,269 | 11/1979 | Craig ................................. 192/70.2 |

FOREIGN PATENT DOCUMENTS 429364 4/1911 Italy ........................................ 192/70.2

Primary Examiner—George H. Krizmanich
Attorney, Agent, or Firm—Mack L. Thomas

[57] ABSTRACT

A multiple wet disc brake or clutch is disclosed which includes a disc pack located in a housing. The stator discs in the disc pack are retained in the inner peripheral surface of the housing by curved tabs extending radially outward about the peripheral surface of each stator disc and engaging respective curved groove areas between margins in the inner peripheral surface of the housing. The stator disc tabs contact one margin of the respective grooves when the hub is rotated in a first direction to form a horn-shaped chamber between the converging outer surfaces of said respective tabs and grooves. An opposite second horn-shaped chamber is formed between the respective other margin of the grooves and stator tabs when the hub is rotated in a second direction. Brake or clutch cooling liquid and impurities contained therein will be forced under centrifugal force into the respective grooves and more specifically into the respective horn-shaped chambers which act as cooling liquid filters.

5 Claims, 3 Drawing Figures

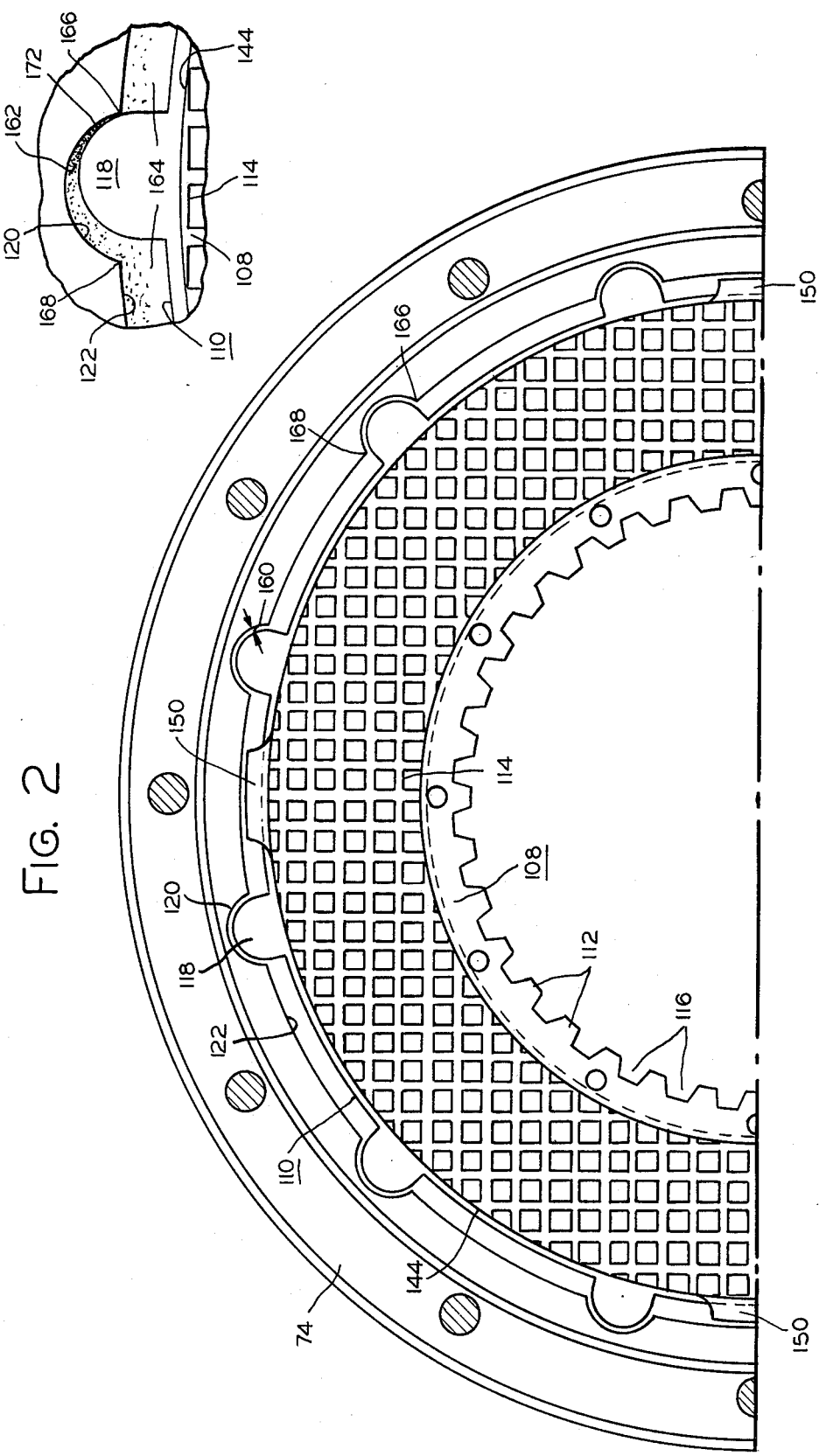

WET DISC BRAKE OR CLUTCH WITH CURVED STATOR DISC TABS

BACKGROUND OF THE INVENTION

1. Field of the Invention

The field of art to which this invention pertains includes fluid pressure operated mechanisms and more specifically multiple disc wet brakes and clutches.

2. Description of the Prior Art

Multiple disc wet brakes and clutches utilize disc packs located in the fluid retaining cavity of a housing that include a plurality of axially movable or compressible stator discs and a plurality of axially movable or compressible rotor discs, intermediate adjacent ones of the stator discs mounted for rotation with a hub portion. These mechanisms are generally hydraulically actuated via a piston that is hydraulically pressurized. The friction developed between the interfacing surfaces of the stator discs and rotor discs restrains the rotation of the hub in a manner well known in the art.

Two methods of retaining the stator discs in an anchored position are common in the prior art. In one method, as shown in U.S. Pat. No. 3,730,301 to Heck et al, the stator discs are held against rotation in a spline-like manner by fitting about bolts circumferentially spaced about the housing. The second method, as exemplified in U.S. Pat. No. 2,519,965 to Wellman, is to provide the stator discs with a plurality of radially outwardly extending projections and associated grooves, both of a polygonal configuration with sufficient clearance between the tabs and grooves to allow axial movement of the stator discs to provide selective compression of the disc pack. In the first method the bolts are a source of fluid leakage and require special sealing while the polygonally configured projections and depressions of the second method are expensive and time consuming to manufacture.

An additional persistent problem in the prior art wet disc brakes and clutches has been to eliminate or control foreign matter, such as dirt or grease which remained in the brake or clutch housing cavity after original manufacture or repairs, as well as foreign material entering the housing cavity through fluid seals from causing excessive wear on the friction surfaces of the disc pack.

SUMMARY OF THE INVENTION

In the present invention tabs having a curved configuration are provided on the outer peripheral surface of the stator disc for engagement with respective aligned grooves having a curved configuration between respective margins in the inner peripheral surface of the housing. The above structure has the advantage of minimizing fluid seals and leakage problems inherent in the locating bolt method of stator disc retention and is less costly to manufacture than the stator discs with polygonally shaped outer tabs.

Additionally, and totally unexpectedly, the curve-shaped stator disc tabs and associated respective curved grooves apparently act as traps for capturing and retaining foreign matter found in the cooling fluid of the wet disc brake or clutch.

Under rotation of the hub portion each stator disc tab will shift and abut against one of the margins of the groove to form a horn-shaped chamber between the converging outer surface of the stator disc tab and inner surface of the groove with the opening of the horn-shaped chamber being between the other margin and the tab and the tip of the horn-shaped chamber being defined by the tab-groove contact. Upon a reversal of rotation of the rotor discs a similar opposite horn-shaped chamber is formed. When the rotor discs are rotating the cooling fluid and foreign matter contained therein will be forced, due to centrifugal force, to collect in the grooves in the housing where the foreign matter will tend to accumulate and be compacted in the lower tip of the respective chambers. The chucking action of the stator discs due to changes of rotation of the rotor discs, agitates and pulverizes the foreign matter trapped in the horn-shaped chambers. The compacted foreign matter built up in the chambers will tend to adhere to the surface of the grooves.

The curved stator disc tab impurity trap of the present invention does not employ cooling fluid filters or other complicated apparatus. However, the filtering action of the curved stator disc tab impurity trap serves the identical function by prolonging the useful life of friction surfaces of the disc pack.

Further features and advantages of this invention will be more readily understood by persons skilled in the art when following the detailed description in conjunction with the several drawings.

BRIEF DESCRIPTION OF THE DRAWINGS

FIG. 2 is a fragmentary simplified partially schematic view taken along line 2—2 of FIG. 1; and FIG. 3 is an enlarged exaggerated detail view of the engagement between a stator tab and respective grooves in the peripheral inner surface of the brake housing.

DESCRIPTION OF THE PREFERRED EMBODIMENT

Figure 1:
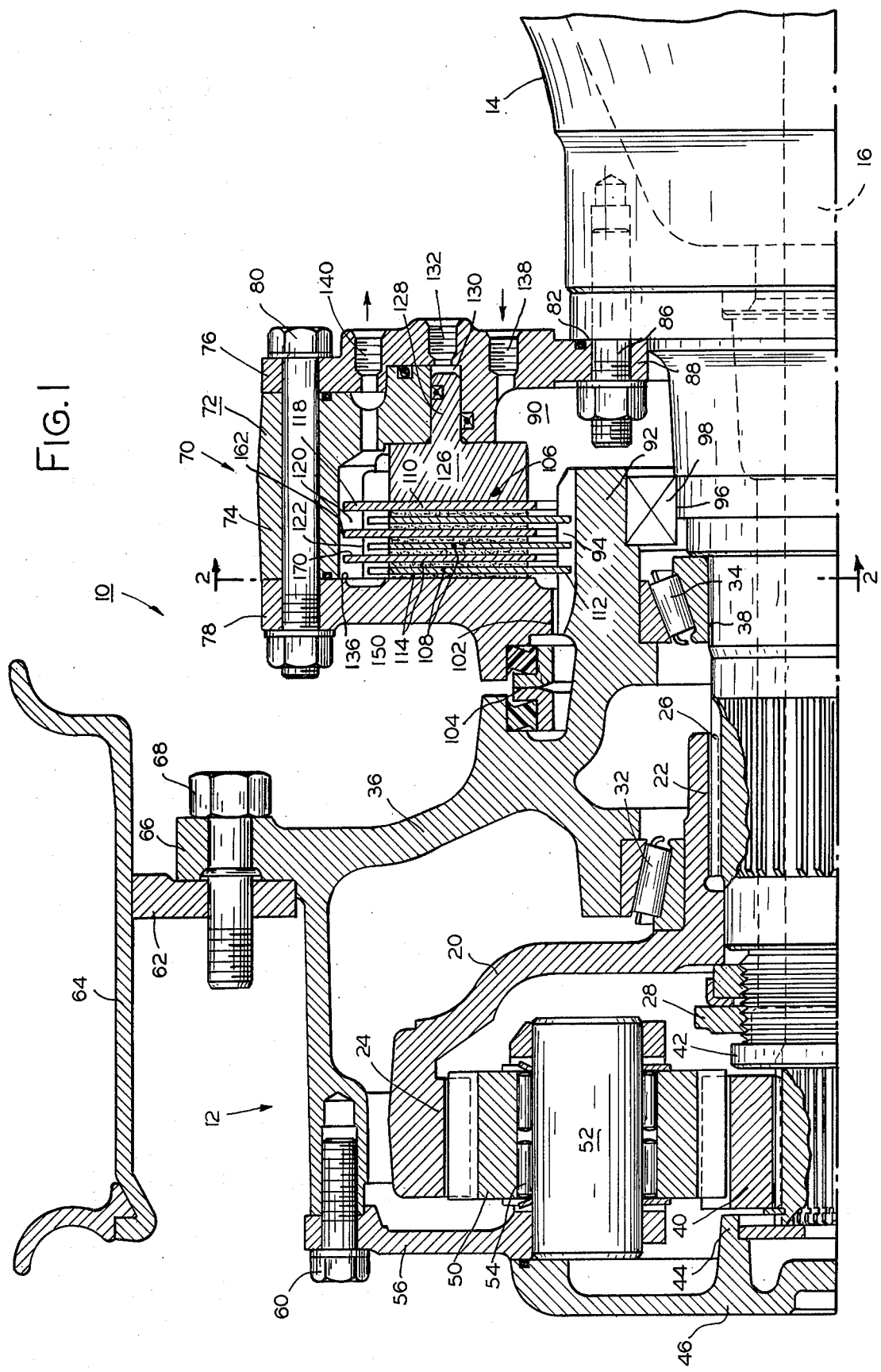
FIG. 1 is a fragmentary, partially sectional view of a drive axle outer end embodying the improved wet disc brake assembly of the present invention.

Referring now to the drawings, specifically to FIG. 1, the reference numeral 10 generally denotes a drive axle equipped at each end (only one end of which is shown) with a planetary gear outer end assembly 12 and an axle housing 14 that contains a differential (not shown) drivingly connected to planetary assembly 12 via an axle drive shaft 16.

Planetary assembly 12 includes hub 22 of a mounting member 20 which supports planetary ring gear 24, with hub 22 being internally splined to axle housing 14 at 26. Mounting member 20 is confined against axial movement by a lock nut 28. A pair of opposed tapered roller-type anti-friction bearings 32 and 34 combine to journal wheel hub 36, with outboard wheel hub bearing 32 having its inner race supported on hub 22 of mounting member 20 while the inner race of inboard bearing 34 is supported on shoulder 38 of axle housing 14. Mounting member 20 can be axially adjusted in order to properly preload bearings 32 and 34, with this adjustment also being accomplished via lock nut 28.

A sun gear 40 is splined to the outer end of axle drive shaft 16 and is axially restrained in position by an annular abutment member 42 attached to the outer end of axle housing 14 and annular rib member 44 that projects inwardly from closing cap 46. Sun gear 40 meshes with a plurality of equiangularly disposed planetary pinions 50 which are journalled, via bearings 54, on planet pins 52 that extend between and are affixed to the opposed walls of planetary pinion carrier 56. Planetary pinions 50 also mesh with internal ring gear 24.

Planetary pinion carrier 56 is fastened to wheel hub 36 by a plurality of machine bolts 60 and forms an apertured end plate which is closed by cap 46 fixedly secured to carrier 56. A wheel disc 62, carrying a wheel rim 64, is secured to flange 66 of wheel hub 36 in a conventional manner by a plurality of machine bolts 68.

In operation, the rotation of sun gear 40 by axle drive shaft 16 rotates planetary pinions 50 which in turn react against fixed internal planetary ring gear 24 thereby rotating carrier 56 which thus becomes the output element of planetary gear outer end assembly 12. The rotation of carrier 56 in turn causes the rotation of wheel hub 36 and consequently of wheel rim 64.

A multiple disc friction brake, generally designated by the numeral 70, is provided adjacent to and externally of wheel hub 36. Specifically, brake 70 includes a housing assembly 72 that is comprised of a central annular portion 74 that separates inner and outer apertured end plates 76 and 78, respectively. Plates 76 and 78 are sealingly attached to central portion 74 via a plurality of angularly spaced peripheral nut and bolt assemblies 80 passing therethrough. Housing assembly 72 is attached to vertical face portion 82 of axle housing 14 via a plurality of angularly spaced conventional stud and nut assemblies 86 that serve to sealingly attach lower flange portion 88 of inner end plate 76 to axle housing face portion 82.

Brake housing assembly 72 has a generally torus-shaped inner cavity 90 and projecting thereinto is a cylindrical portion 92 of wheel hub 36, with portion 92, which acts as a brake hub, being provided with external splines 94. The inner peripheral surface of cylindrical portion or brake hub 92 is sealed, relative to shoulder 96 of axle housing 14 via seal member 98. Additional sealing between wheel hub 36 and brake outer end plate 78, relative to fluid leakage through splines 94 and inner peripheral surface 102 of outer end plate 78, is provided via a seal 104.

Brake 70 includes a disc pack 106 having a stack of axially movable or compressible but alternately disposed annular brake discs 108 and 110, with rotor discs 108 being provided with a series of teeth or tabs 112 of any desired shape around their inner peripheries. Tabs 112 are received in the spaces between splines 94 on wheel hub cylindrical portion 92, thereby permitting rotor discs 108 to move axially on splines 94 while at the same time rotating with wheel hub 36. Three spaced locating tangs 150 are provided on each rotor surface 144 to maintain the vertical position of the rotor discs 108 while wheel hub 36 is removed during the servicing of wheel hub bearings 32. Rotor discs 108 preferably are provided with a friction material 114 on their oppositely disposed annular surfaces.

Interposed between rotor discs 108 are stator discs 110 whose outer peripheries are provided with a series of spaced tabs or teeth 118 of curved shape, with tabs 118 being at least partially received within associated grooves 120 in the inner peripheral surface 122 of brake central portion 74. Each groove 120 has two margins 166 and 168 with a curved surface therebetween. Both tabs 118 and grooves 120 are preferably but not necessarily of the same curved shape with tab 118 having a slightly smaller size. Additionally, although the curved shape of the stator disc tabs 118 and respective grooves 120 are preferably as shown in FIGS. 2 and 3 for ease of manufacture, other curved shapes can be utilized without departing from the scope of this invention. Friction brake 70 thus provides a plurality of axially movable brake discs, with stator discs 110 anchored against rotation to brake portion 74 and rotor discs 108 connected for rotation with wheel hub 36. Pockets 170 of cooling liquid 164 are provided between spaced apart stator disc tabs 118 in each of the grooves 120.

Multiple wet disc brake 70 is hydraulically actuated by an annular piston 126, a portion 128 of which is disposed in a cavity 130 formed in brake housing assembly 72. Hydraulic fluid under pressure is supplied to cavity 130 by means of aperture 132 in inner end plate 76. A bleeder fitting (not shown) is provided to the hydraulic system in a manner well known in the art. Friction brake 70 is actuated by increasing the hydraulic fluid pressure in cavity 130 by a conventional means so as to move piston 126 to the left as shown in FIG. 1. This in turn moves brake discs 108 and 110 to the left until they abut inner surface 136 of outer end plate 78. The friction developed between the interfacing surfaces of brake discs 108 and 110 restrains the rotation of brake discs 108, thereby restraining the rotation of wheel hub 36.

A predetermined clearance 160 is provided between each tab 118 and respective groove 120 to permit axial movement of stator discs 110 in response to hydraulic actuation of annular piston 126 and reciprocal movement of said stator disc tabs 118 in said grooves 120 as a result of reversals in rotation of said rotor discs 108. FIG. 2 schematically illustrates the predetermined clearance 160 between the stator disc tabs 118 and respective grooves 120. In FIG. 3 the clearance between the tabs 118 and respective margins of the grooves 120 and movement of tabs 118 in respective grooves 120 is exaggerated for purposes of illustration. In actual operation the tabs 118 shift or chuck from contact with one of the margins of the respective grooves to contact with the other margin due to changes in rotation of rotor disc 108 and move a very small distance.

As previously noted, brake inner cavity 90, in which the braking action due to discs 108 and 110 occurs, is sealed relative to wheel hub 36 and axle housing 14. In order to provide the required cooling, cooling liquid 164 is preferably continuously directed, via any conventional means (not shown), into cavity 90 via aperture 138 in end plate 76. After flowing through cavity 90 and thereby cooling brake discs 108 and 110, the cooling liquid 164 is exhausted from cavity 90 via aperture 140 in end plate 76 by any desired conventional means.

In FIG. 3 the tab 118 has shifted or chucked to one side of the groove 120 and is in abutment with a margin 166 of groove 120 in response to rotation of the rotor disc 108 in a first direction to form a first horn-shaped chamber (shown exaggerated for purposes of illustration) between the converging outer surfaces of the stator disc tabs and respective grooves with the opening of the first horn-shaped chamber being between the other margin 168 of each respective groove 120 and tab 118 and the tip 172 of the horn-shaped chamber being defined by the tab-groove contact. When the rotor is rotated in an opposite second direction the tab 118 shifts or chucks in an opposite direction as that shown in FIG. 3 to be in abutment with the other margin 168 of grooves 120 to form a similar second horn-shaped chamber (not shown) defined by the converging outer surfaces of the stator disc tabs and respective grooves with the opening of the second horn-shaped chamber being between the one margin 166 and the tab 118 and the tip of the second horn-shaped chamber being defined by the point of contact between the other margin 168 of the groove 120 and the tab 118.

Due to rotation of rotor discs 108, cooling fluid 164 in the cavity of the housing portion along with any foreign matter contained therein will be forced, under centrifugal force, to the inner peripheral surface 122 of brake central portion 74. The foreign matter contained in the cooling fluid due to the heavier weight of the foreign matter will collect in the grooves 120 and more specifically in the horn-shaped chambers 162 and pockets 170 of cooling fluid 164 therebetween. Foreign matter in the chambers will tend to accumulate in the lower tip 172 of the chamber and become compacted therein. The chucking action of the stator tabs 118, due to changes in rotation of rotor discs 108, agitates and pulverizes the foreign matter and compacts in the chambers 120. The compacted foreign matter will build-up in the chambers 162 and will tend to fill the respective chambers. However, the normal life of the disc pack will usually be spent before the chambers are filled with foreign matter sufficient to prevent stator disc tabs 118 from shifting or chucking depending on the amount of foreign matter contained in cooling fluid 160.

From the foregoing, it is believed that those familiar with the art will readily recognize and appreciate the novel concepts and features of the present invention. Obviously, the curved stator disc tab concept is not limited to wet disc brakes but can also be readily applied to multiple plate fluid-pressure actuated clutches used in powershift types of transmissions, for example. While the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. A multiple disc brake or clutch having an axis and comprising:

an outer housing member with an inner coaxial cylindrical surface;

a plurality of axially extending grooves in said cylindrical surface, each of said grooves including a pair of spaced apart margins and having a curved shape between said margins;

a disc pack located in said housing including a plurality of rotor discs arranged for reversible rotation about said axis and interleaved with a plurality of stator discs;

said stator discs each having a plurality of tabs around the periphery extending into said grooves respectively, each of said tabs having a curved outer surface;

a predetermined clearance provided between each tab and its respective groove, said clearance permitting reciprocal movement of said tabs in said grooves as a result of reversals in rotation of said rotor discs;

means for circulating cooling liquid through said disc pack; and each of said tabs contacting one of said margins when said rotor discs are rotating in a first direction to form a chamber between converging outer surfaces of said respective tabs and grooves for trapping foreign matter found in the cooling liquid, said chamber having an opening between the other margin of each of said grooves and said respective tab where the cooling liquid enters and having a tip defined by the contact between said tab and one margin contact where as a result of centrifugal force said foreign matter accumulates and becomes compacted.

2. The multiple disc brake or clutch as claimed in claim 1 wherein upon reversal of said rotor disc each of said tabs chuck to the other margin of each of said grooves so that the foreign matter trapped in the chamber is agitated and pulverized, an opposite second chamber being defined by said converging outer surfaces of said respective tabs and grooves similar to said first chamber and having an opening between said one margin and said tab and having a tip at the point of contact between said tab and other margin.

3. The multiple disc brake or clutch as claimed in claim 2 wherein said first chamber and said second chamber are horn-shaped.

4. A multiple disc brake or clutch as claimed in claim 2 wherein said predetermined clearance is a uniform clearance between said respective tabs and said grooves.

5. The invention as claimed in claim 2 wherein said curved shape of said outer surfaces of said respective tabs and depressions is substantially identical with said tabs being of slightly smaller size.

* * * * *